May 28, 1929.  C. F. OPITZ  1,715,173
INSECT TRAP
Filed March 5, 1927
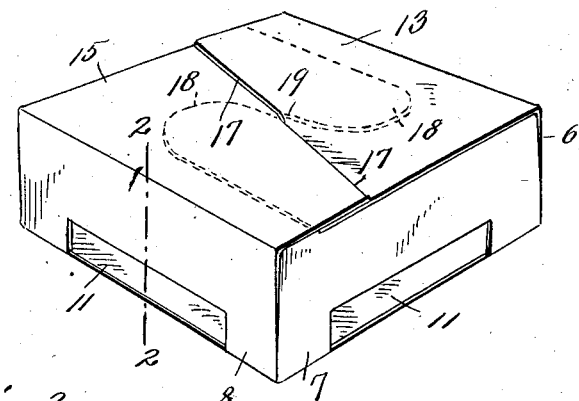
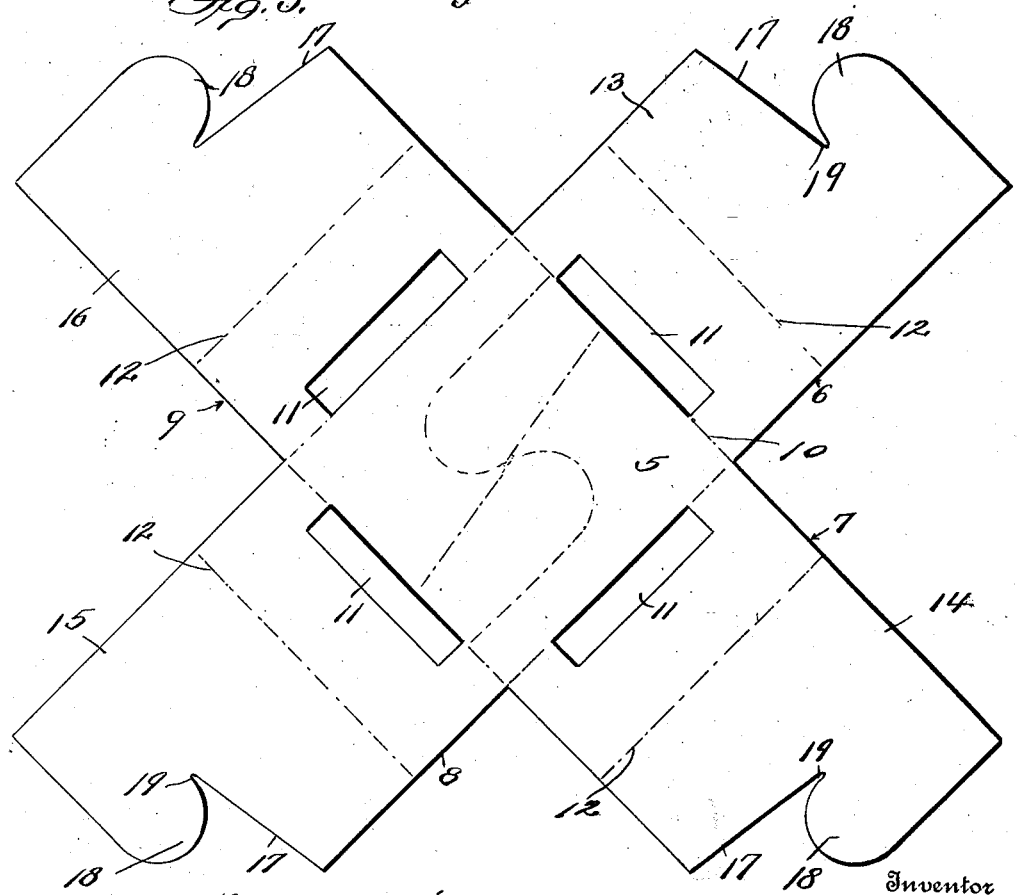
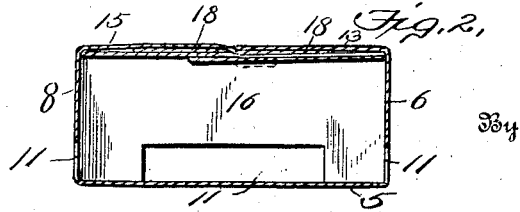

Patented May 28, 1929.

UNITED STATES PATENT OFFICE.

CHARLES F. OPITZ, OF NEW YORK, N. Y.

INSECT TRAP.

Application filed March 5, 1927. Serial No. 173,132.

This invention relates to improvements in traps for roaches, water-bugs and like pests, and the primary object is to provide a very simple and convenient form of folding box-like trap especially intended as an effective means for introducing, vending and using an exterminating paste adapted to effectively exterminate pests of the character set forth when applied to a lure placed in the trap.

A further object of the invention is to provide a trap of economical construction which can be readily disposed in operative position and will prove exceptionally effective for the service for which it has been designed.

With these and other objects in view, the invention consists in the construction and arrangement of the several parts which will be described and claimed more fully hereinafter.

In the drawing:—

Figure 1 is a perspective view of a trap embodying the features of the invention.

Figure 2 is a transverse vertical section on the line 2—2 Figure 1.

Figure 3 is a plan view of a blank from which the trap is formed.

The improved trap is in the form of a folding box made from a single blank or sheet, preferably square in contour, the essential feature of which is the provision of an economical means in the form of an enclosure for containing a lure to which has been applied a poisonous material.

One of the preferred forms of the improved trap is made from the blank illustrated by Figure 2, and comprising a bottom 5 from the four sides of which projects folding flaps 6, 7, 8 and 9. Each flap has a crease line 10 at the point of connection thereof with the base 5, and an adjacent elongated rectangular insect inlet opening 11. The lower edge of this opening is flush with the bottom 5 and is of such a size in length as to permit the removal and insertion of the lure therethrough without taking down the trap after once it has been set up. Each flap is further intermediately formed with a crease line 12 whereby the four sides of the box or trap is constructed, and the top or cover flaps 13, 14, 15 and 16 are the terminals of the four flaps. Each top or cover flap has an outer locking extremity which comprises an inclined edge 17 which extends from a point slightly beyond the center and at an angle less than a diagonal of the bottom 5, and a laterally projecting tongue 18 which is preferably formed with a terminal of rounded form having a notch or seat 19 at the point of intersection thereof with the inclined edge 17. The inclined edges and tongues 17 and 18 are reversely positioned on opposed flaps so that tongues of each pair of opposed flaps will project in reverse directions and, when engaged, will interlock. The object of the inclined edges 17 is to produce an interlocking clearance for the opposed pair of interlocking tongues while the notches 19 provide seats for holding against accidental unlocking, as, for instance, the tongues of the flaps 6 and 8 and the tongues of the flaps 7 and 9.

The improved box-like trap when constructed for commercial use will have the blank, as shown by Figure 3 flattened out, said arrangement of the blank for the box being also materially advantageous in shipping or transporting the same in compact form, and when arranged for formation of the box, a lure consisting of a slice of vegetable or other suitable bait is placed upon the center of the bottom or base 5 and has applied thereto a poisonous paste or material, and the trap or box is completed by infolding, as, for instance, the flaps 6 and 8 on the crease 10, first bending the outer top cover flaps on the crease lines 12 and interlocking the tongues 18 by slipping the extremity of one under the extremity of the other, as shown in Figure 3, and the completing of the trap box enclosure by likewise infolding and securing the flaps 7 and 9 over the top of the infolded and locked flaps 6 and 8 and securing the tongues of the flaps 6 and 8. When assembled in box-like form, the improved trap will be completed and have the appearance shown in Figure 1, the openings 11 permitting the ingress and egress of roaches and other similar pests to the lure held within and on the bottom of the box and carrying thereon a suitable coating or quantity of the poisonous paste or material. The openings 11 are of such dimensions that they will give free access to roaches or other pests to the lure having the paste applied thereto, and these pests will be attracted by the odor of the lure which is free to be scented by the pests through the openings 11.

It is a well known fact that roaches and like pests instinctively seek food under cover of darkness, and if the enclosure or room infested by these pests is entered by anyone, or said enclosure or room is illuminated, the pests will quickly run away and hide themselves in crevices of woodwork and other similar places. If they have entered the trap and eaten of the paste treated lure the result will be the death and drying up of the pests without any odor.

The improved trap or box-like form is capable of repeated use and replenishment of the lure treated with the said exterminating paste, in view of the fact that the locking means for the flaps may be readily separated by a simple operation and then subsequently reconnected or locked. The openings 11 are also of such a size as to permit the introduction of the renewal lure therethrough without the disconnection of the locking terminals. The cover flaps also reinforce the top of the trap, in the doubled form set forth, with an extra thickness of material, and said flaps will remain in their locked position with one set of flaps over the other without liability of accidental disconnection, and thus provide for access to and outlet from the trap solely through the openings 11.

In the construction of the improved trap it is preferred that cardboard of suitable thickness and toughness be used, and it will also be further understood that changes in the dimensions and proportions of the several parts may be modified without in the least departing from the nature or spirit of the invention.

What is claimed is:—

A knock-down insect trap made from a single sheet of bendable material and formed to provide a rectangular bottom, four wings one to each side of the bottom and bendable at the junctions therewith, each wing providing a side wall and a terminal locking portion, the latter having an angular edge extending from the outer edge of the terminal to a point beyond the center and when folded being on a line of lesser angle than the diagonal of the bottom and nearly approaching the medial line of the bottom, and also a rounded head providing with the angular edge a relatively deep notch, and the opposed terminals being adapted to interlockingly fit in said notches and normally hold the terminals against separation, the walls each being provided with a relatively long opening the lower edge of which is formed by the bottom and through which the pests may have ingress and egress and the lure may be inserted or removed therethrough.

In testimony whereof I have hereunto set my hand.

CHARLES F. OPITZ.